United States Patent
Ando et al.

(10) Patent No.: US 6,602,970 B2
(45) Date of Patent: Aug. 5, 2003

(54) 2-CYANOACRYLATE COMPOSITION

(75) Inventors: Yushi Ando, Aichi (JP); Seitaro Tajima, Aichi (JP); Yoshiharu Ohashi, Aichi (JP); Haruhiko Takeya, deceased, late of Saitama (JP); by Kazuo Takeya, legal representative, Hyogo (JP); Setsuko Miyanari, Saitama (JP); Toshihiro Kobori, Saitama (JP)

(73) Assignees: Toagosei Co., Ltd., Tokyo (JP); Cosmo Oil Co., Ltd., Tokyo (JP)

( * ) Notice: Subject to any disclaimer, the term of this patent is extended or adjusted under 35 U.S.C. 154(b) by 50 days.

(21) Appl. No.: 09/878,928

(22) Filed: Jun. 13, 2001

(65) Prior Publication Data

US 2002/0029848 A1 Mar. 14, 2002

(30) Foreign Application Priority Data

Jun. 13, 2000 (JP) .......................................... 2000-176640

(51) Int. Cl.$^7$ ............................................. C08F 222/36

(52) U.S. Cl. .................. 526/298; 526/292.2; 526/299; 526/198; 526/204; 526/205; 526/297; 525/295; 525/261

(58) Field of Search .............................. 524/765, 773, 524/775, 789; 526/298, 292.2, 299, 198, 204, 205; 525/267, 295

(56) References Cited

U.S. PATENT DOCUMENTS

| | | | | |
|---|---|---|---|---|
| 4,170,585 A | 10/1979 | Motegi et al. | ......... | 260/33.2 R |
| 4,171,416 A | 10/1979 | Motegi et al. | ............... | 526/245 |
| 4,556,700 A | 12/1985 | Harris et al. | ................. | 526/209 |
| 4,622,414 A | 11/1986 | McKervey | .................... | 560/61 |
| 4,636,539 A | 1/1987 | Harris et al. | ................. | 523/214 |
| 5,824,808 A | 10/1998 | Hori et al. | ...................... | 549/1 |
| 5,998,631 A | 12/1999 | Kumagai et al. | ............. | 549/11 |
| 6,323,275 B2 * | 11/2001 | Takahashi et al. | ........... | 524/765 |

* cited by examiner

*Primary Examiner*—Tatyana Zalukaeva
(74) *Attorney, Agent, or Firm*—Sughrue Mion, PLLC

(57) ABSTRACT

A 2-cyanoacrylate composition comprising a cyclic phenol sulfide derivative. The composition has a high curing rate and is excellent in moist-heat resistance, surface curability and clearance curability.

7 Claims, No Drawings

2-CYANOACRYLATE COMPOSITION

FIELD OF THE INVENTION

The present invention relates to a 2-cyanoacrylate composition which has a high curing rate and is excellent in moist-heat resistance, surface curability, and clearance curability.

BACKGROUND OF THE INVENTION

2-Cyanoacrylates undergo instantaneous anionic polymerization to exhibit a high bonding strength. The 2-cyanoacrylates are hence widely utilized as instantaneous adhesives or rapid-setting filling materials in various industrial fields, the medical field, and the leisure field and in domestic applications. However, since the curing is based on anionic polymerization, the polymerization may be inhibited when the 2-cyanoacrylates are applied to woods or adherends which are acidic having a surface on which an oxide film is apt to form. In such cases, a prolonged setting time is required and the resultant bonding strength is not entirely sufficient. Another problem is that since the polymerization is initiated mainly by the water present in a slight amount on the adherends, a prolonged setting time is necessary on engineering plastics having a surface with a poor affinity for water, such as polyacetals and poly (butylene terephthalate).

Furthermore, use of 2-cyanoacrylates as a potting material, filling material, or instantaneous adhesive has had a problem that the composition has poor curability, i.e., necessitates a prolonged setting time, when applied to a relatively wide gap between adherends (hereinafter, curability in this application is referred to as "clearance curability"). Another problem thereof is that those parts of the composition which have overflowed on a surface necessitate a prolonged setting time and, in some cases, impair the appearance of the product (hereinafter, those properties are inclusively referred to as "surface curability"; in particular, the time required for setting is referred to as "surface setting time" and the appearance of the resultant cured material is referred to as "appearance of surface-cured material").

Various curing accelerators have conventionally been investigated in order to overcome such problems. For example, U.S. Pat. No. 4,171,416 discloses the use of a crown ether compound as a curing accelerator. U.S. Pat. Nos. 4,170,585 and 4,377,490 disclose the use of a polyalkylene glycol derivative having a specific structure and a mixture of an aliphatic or aromatic polyol with an aliphatic or aromatic polyether, respectively, as a curing accelerator. Furthermore, U.S. Pat. Nos. 4,386,193 and 5,589,554 disclose the use of a three- or four-arm polyol podand compound having a specific structure and a compound having cyano and carboxyl groups, respectively, as a curing accelerator.

However, 2-cyanoacrylate compositions containing those curing accelerators have a drawback that when the compositions are used as adhesives or filling materials, the resultant cured objects have impaired moist-heat resistance although an improved curing rate is attained.

Besides having such impaired moist-heat resistance, the 2-cyanoacrylate compositions containing a crown ether or polyethylene glycol derivative as a curing accelerator have a drawback that the cured material itself obtained therefrom has a milk-white surface.

The term "moist-heat resistance of a cured object" as used herein means the moist-heat resistance of a structure obtained through bonding or filling with a 2-cyanoacrylate composition. This property is a basic performance always required of cured objects for use in industrial fields including the electrical/electronic, construction/civil engineering, and automobile industries. The persons who use cyanoacrylate adhesives well know that structures formed through bonding or filling with a 2-cyanoacrylate composition deteriorate in strength with the lapse of time when used or stored at a temperature and humidity which are high in some degree, and finally become unsuitable for practical use. This phenomenon is described in known documents including Kôgyô Zairyô, 16(12) 73 (1968).

Furthermore, the term "milk-white appearance of a cured material" as used herein means that a cured material formed by applying a 2-cyanoacrylate composition to a substrate and curing it in air appears milk-white. It is thought that when such a 2-cyanoaccrylate adhesive is used, the overflow which can result from application of the adhesive does not remain colorless and transparent but becomes white to thereby impair the appearance of the product.

The present inventors found that use of the conventional 2-cyanoacrylate compositions whose curability has been improved with curing accelerators which are added to 2-cyanoacrylate composition results in a considerable decrease in moist-heat resistance. As will be demonstrated by the Comparative Examples given later, when 2-cyanoacrylate compositions containing a crown ether, polyethylene glycol derivative, or Calixarene derivative as a curing accelerator are used to bond or fill various materials, the cured objects thus obtained have lower moist-heat resistance than cured objects obtained with 2-cyanoacrylate compositions containing none of these curing accelerators. In the case where a curing accelerator is incorporated in a larger amount so as to obtain an even higher curing rate, the decrease in moist-heat resistance becomes greater. Conversely, in the case where a curing accelerator is added in a reduced amount so as to prevent deterioration in strength and attain satisfactory moist-heat resistance, the instantaneously bonding properties of this composition is on an unsatisfactory level.

Consequently, it has been necessary that a 2-cyanoacrylate composition containing a reduced amount of a curing accelerator and having reduced curability be selected for use in applications wherein moist-heat resistance is important and that the insufficient curability thereof be compensated for by heating the adherend, using a primer, etc. This technique, however, considerably impairs applicability, which is a merit of 2-cyanoacrylate compositions. Although there is a desire for a rapid-setting 2-cyanoacrylate composition having high moist-heat resistance, it has been difficult to satisfy this requirement with any conventional curing accelerator.

Many attempts have been made to enhance moist-heat resistance. For example, JP-A-7-33726 (the term "JP-A" as used herein means an "unexamined published Japanese patent application") and JP-A-6-145605 disclose a process for producing a polyfunctional cyanoacrylate and the incorporation of a polyfunctional acrylate having a specific structure, respectively. JP-B-56-54029 (the term "JP-B" as used herein means an "examined Japanese patent publication") and JP-A-48-103633 disclose the incorporation of a carboxylic anhydride and the incorporation of a specific organic silane compound, respectively. JP-A-57-164173 and JP-A-2-208380 disclose the incorporation of a 1,1-disubstituted diene and the incorporation of an ethoxysilane isocyanate into a 2-cyanoacrylate just before use, respectively. JP-A-3-265675 and JP-A-4-146982 disclose the incorporation of a specific phosphoric acid compound and the incorporation of a specific silicone oil, respectively. JP-A-2-311583 and JP-A-6-57215 disclose the incorporation of fine particles of a crosslinked polymer synthesized by the non-aqueous dispersion method and the incorporation of a specific polyhydroxy compound and an acrylic ester copolymer elastomer, respectively. Furthermore, JP-A-7-53924 and JP-A-7-157719 disclose the incorporation of an acrylonitrile/butadiene copolymer and a specific amount of pyrogallol and the incorporation of a specific amount of a phthalic ester, respectively. However, each of those techniques has only given results which are unsatisfactory in curability.

On the other hand, it has been proposed to use various surface-treating agents for the purpose of improving the clearance curability and surface curability of 2-cyanoacrylate compositions. For example, JP-B-62-29471 discloses a composition comprising an N,N-di(lower alkyl) toluidine, saccharin, and ascorbic or isoascorbic acid, and JP-B-62-12279 discloses the use of a specific surfactant. JP-B-60-24826 discloses the use of methylolurea which may have been partly alkoxylated, melamine, or a derivative of either. JP-B-54-19416 and JP-B-51-25441 disclose a technique in which an adherend is treated beforehand with N,N-dimethyl-m-toluidine and with a vinyl ether or vinyl thioether, respectively. JP-B-49-12094 discloses a technique in which an adherend surface is treated with a liquid containing an amine, amide, or imide, and JP-B-48-44175 discloses a technique in which an adherend surface is treated with a liquid containing a specific heterocyclic compound. JP-B-47-8718 discloses a technique in which an adherend surface is treated beforehand with a liquid containing dimethylaniline or/and tris[1-(2-methyl)aziridiyl]phosphine oxide. Furthermore, JP-A-39-844 discloses a technique in which an adherend surface is treated beforehand with an epoxide or diepoxide.

Curing accelerators to be added to 2-cyanoacrylate compositions have also been investigated in order to improve clearance curability and surface curability. For example, JP-B-5-72946 and JP-A-7-316505 disclose the use of a Calixarene compound and an organotitanium compound, respectively, as a curing accelerator.

It has further been attempted to improve surface curability and clearance curability by imparting photocurability to a 2-cyanoacrylate composition. For example, JP-A-9-249708 discloses the use as an anionic photopolymerization initiator of a metallocene compound comprising a transition metal of Group VIII of the periodic table and aromatic ligands. JP-A-6-299122 and International Publication WO 93/10483 disclose the use of an aromatic azide compound and an inorganic chromium complex, respectively, as an anionic photopolymerization initiator. Furthermore, JP-A-62-57475 discloses a cyanoacrylate-based adhesive composition containing a free-radical photopolymerization initiator.

However, the techniques described above each have had one or more drawbacks as will be described below, such as poor applicability, poor storage stability, and the necessity of a light irradiator. Namely, those techniques have been unsatisfactory because the advantage inherent in 2-cyanoacrylate compositions that the operation can be completed in a short period of time is lost.

Specifically, those conventional techniques have the following drawbacks. The technique in which a surface-treating agent is used is satisfactory in attaining a shortened operation period because it greatly improves surface curability and clearance curability. However, applicability is considerably impaired because two liquids should be applied.

The technique in which a curing accelerator is used is effective in improving curability in application to closely spaced adherends. However, this technique has been unsatisfactory in surface curability and clearance curability.

The technique in which photocurability is imparted is satisfactory in operation period because it can improve surface curability and clearance durability. However, this technique has been unsatisfactory in that it necessitates a light irradiator and that it is unusable for the bonding of adherends having such a structure that irradiation of the bonding surface with light is impossible. Namely, there has been a desire since long before for a 2-cyanoacrylate composition which consists of one component curable at ambient temperature and not necessitating a light irradiator or the like and which cures in a short period of time even in the case where it is used as a potting material, has overflowed, or is applied to a relatively wide gap between adherends.

SUMMARY OF THE INVENTION

The present invention has been made to overcome the above-described drawbacks in the conventional techniques.

Accordingly, an object of the invention is to provide a 2-cyanoacrylate composition which is free from a considerable decrease in moist-heat resistance and has a sufficiently high curing rate even when applied to adherends having a gap, and overflow parts of which also cure rapidly and are prevented from giving a milk-white cured material.

As a result of intensive investigations made by the present inventors in order to overcome the above-described problems, it has surprisingly been found that when a cyclic phenol sulfide derivative having a specific structure is used as a curing accelerator for a 2-cyanoacrylate, then all the problems described above are overcome. Namely, this composition was found to retain a sufficiently high curing rate without causing a decrease in moist-heat resistance, has a sufficiently high clearance curing rate, and gives a cured material having a colorless transparent appearance. The invention has been completed based on this finding.

The invention provides a 2-cyanoacrylate composition which contains a cyclic phenol sulfide derivative having a specific structure.

DETAILED DESCRIPTION OF THE INVENTION

Cyclic Phenol Sulfide Derivative

The cyclic phenol sulfide derivative used in the invention is a compound represented by the following general formula (1).

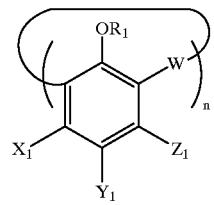

wherein W is a sulfido, sulfinyl, or sulfonyl group; $R^1$ is a functional group which does not initiate polymerization of the 2-cyanoacrylate; $X^1$, $Y^1$ and $Z^1$ each are hydrogen atom or a functional group which does not initiate polymerization of the 2-cyanoacrylate; and n is an integer of 3 to 12. The Ws, $R^1$s, $X^1$s, $Y^1$s, and $Z^1$s each may be the same or different.

The cyclic phenol sulfide derivative to be used in the invention can be obtained through various chemical modifications from a cyclic phenol sulfide represented by the following general formula (2) or (3), which is obtained by reacting a phenol compound with elemental sulfur in the presence of a specific metallic reagent.

(2)

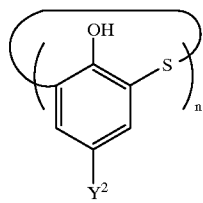

wherein n is an integer of 3 to 12; and $Y^2$ is hydrogen atom, an alkyl group, a halogenoalkyl group, a —$COR^6$ group, an —$OR^7$ group, a —$COOR^8$ group, a —CN group, an —$NO_2$ group, a halogen atom, an —$SO_4R^9$ group, or an —$SO_3R^{10}$ group (wherein $R^6$, $R^7$, $R^8$, $R^9$, and $R^{10}$ each are an alkyl group).

(3)

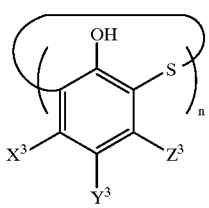

wherein n is an integer of 3 to 12; and $X^3$, $Y^3$, and $Z^3$ each are hydrogen atom, an alkyl group, a halogenoalkyl group, a —$COR^6$ group, an —$OR^7$ group, a —$COOR^8$ group, a —CN group, an —$NO_2$ group, a halogen atom, an —$SO_4R^9$ group, or an —$SO_3R^{10}$ group (wherein $R^6$, $R^7$, $R^8$, $R^9$, and $R^{10}$ each are an alkyl group).

The compounds (2) and (3), which are known substances, can be synthesized by methods described in JP-A-9-227553, JP-A-10-77281, JP-A-10-77282, JP-A-10-81680, and JP-A-10-81681.

The compounds (2) and (3) dissolve in 2-cyanoacrylates. However, they do not function as a curing accelerator for 2-cyanoacrylates when used as they are, because those substances are acidic due to the phenolic hydroxyl groups. In contrast, the cyclic phenol sulfide derivative for use in the invention is a compound obtained by chemically modifying part or all of the phenolic hydroxyl groups of a compound represented by formula (2) or (3) or by converting part or all of the thioether groups of a compound represented by formula (2) or (3) into sulfone or sulfoxide groups with a specific oxidizing agent. Namely, the phenolic hydroxyl groups have undergone a chemical modification. Since the phenolic hydroxyl groups, which are acidic, have been partly or wholly eliminated, the cyclic phenol sulfide derivative thus obtained functions as a curing accelerator for 2-cyanoacrylates. The cyclic phenol sulfide derivative itself used in the invention also is a known substance, and can be synthesized by methods described in the patent documents cited above and in JP-A-10-168078 and JP-A-10-175971.

In the cyclic phenol sulfide derivative represented by general formula (1), at least one, preferably each, of the $R^1$s is a group having two or more oxygen atoms. This derivative is advantageous in that it has better solubility in 2-cyanoacrylates. More preferably, at least one of the $R^1$s is a group selected from —$CH_2COOR^2$, —$COCH_2COR^3$, and —$CH_2COOR^4OR^5$, wherein $R^2$, $R^3$, and $R^5$ each is an alkyl group and $R^4$ is an alkylene group.

Although $X^1$ and $Z^1$ each is hydrogen atom or a functional group which does not initiate polymerization of the 2-cyanoacrylate, they are preferably hydrogen atoms from the standpoint of ease of synthesis.

$Y^1$ is hydrogen atom or a functional group which does not initiate polymerization of the 2-cyanoacrylate. Examples of the functional group include alkyl groups, halogenoalkyl groups, —$COR^6$ groups, —$OR^7$ groups, —$COOR^8$ groups, a —CN group, an —$NO_2$ group, halogen atoms, —$SO_4R^9$ groups, and —$SO_3R^{10}$ groups, wherein $R^6$, $R^7$, $R^8$, $R^9$, and $R^{10}$ each are an alkyl group. The derivative is especially preferably represented by general formula (1) wherein $Y^1$ is tert-butyl, because this derivative has a high curing acceleration effect on the 2-cyanoacrylate composition of the invention.

Although n is an integer of 3 or larger, it is preferably 4 or larger. The upper limit of n is 12. However, n is preferably 8 or smaller, more preferably 6 or smaller.

The cyclic phenol sulfide derivatives for use in the invention as a curing accelerator may be used alone or as a mixture of two or more thereof. Although the cyclic phenol sulfide derivatives that can be used in the invention each are a preferred curing accelerator for 2-cyanoacrylates, especially preferred examples thereof include 5,11,17,23-tetra-tert-butyl-25,26,27,28-tetrakis(ethoxycarbomethoxy)-2,8,14,20-tetrathia[19,3,1,1$^{3,7}$,1$^{9.13}$,1$^{15.19}$]octacosa-1(25),3, 5,7(28),9,11,13(27),15,17,19(26),21,23-dodecaene.

The content of the cyclic phenol sulfide derivative in the composition of the invention is preferably from 0.01 to 20 wt % based on the 2-cyanoacrylate. If the content thereof is lower than 0.01 wt %, the derivative is ineffective in accelerating the curing of the 2-cyanoacrylate. If the derivative is incorporated in an amount exceeding 20 wt %, the storage stability of the 2-cyanoacrylate is considerably impaired. The content of the derivative is more preferably from 0.1 to 5 wt %. When two or more cyclic phenol sulfide derivatives are used, that concentration means the total concentration of these.

2-Cyanoacrylate

The 2-cyanoacrylate which can be made to have an increased curing rate with the cyclic phenol sulfide derivative according to the invention is one for use in cyanoacrylate-based adhesives and the like.

Examples thereof include methyl 2-cyanoacrylate, ethyl 2-cyanoacrylate, propyl 2-cyanoacrylate, isopropyl 2-cyanoacrylate, butyl 2-cyanoacrylate, isobutyl 2-cyanoacrylate, amyl 2-cyanoacrylate, hexyl 2-cyanoacrylate, cyclohexyl 2-cyanoacrylate, octyl 2-cyanoacrylate, 2-ethylhexyl 2-cyanoacrylate, allyl 2-cyanoacrylate, propargyl 2-cyanoacrylate, phenyl 2-cyanoacrylate, benzyl 2-cyanoacrylate, methoxyethyl 2-cyanoacrylate, ethoxyethyl 2-cyanoacrylate, tetrahydrofurfuryl 2-cyanoacrylate, 2-chloroethyl 2-cyanoacrylate, 3-chloropropyl 2-cyanoacrylate, 2-chlorobutyl 2-cyanoacrylate, 2,2,2-trifluoroethyl 2-cyanoacrylate, and hexafluoropropyl 2-cyanoacrylate.

Those 2-cyanoacrylates may be used alone or as a mixture of two or more thereof in preparing an adhesive, filling material, or the like. The cyclic phenol sulfide derivative according to the invention produces a marked effect when applied to lower alkyl 2-cyanoacrylates in which the alkyl has 1 to 6 carbon atoms. Of the 2-cyanoacrylates enumerated above, such lower 2-cyanoacrylates have high curability.

Other Ingredients

The 2-cyanoacrylate composition of the invention comprises the cyclic phenol sulfide derivative and a 2-cyanoacrylate as essential ingredients. In the case where the composition is to be used as an adhesive, additives are generally incorporated besides those ingredients. Such additives include a stabilizer for anionic polymerization, a stabilizer for radical polymerization, a thickener, a curing accelerator, a plasticizer, and a thixotropic agent.

As the stabilizer for anionic polymerization can be used a conventionally known stabilizer for anionic polymerization. Examples thereof include sulfurous acid gas, nitrogen monoxide, hydrogen fluoride, sultone compounds, $BF_3$/ether complexes, $BF_3$/acetic acid complexes, $BF_3$/methanol complexes, methanesulfonic acid, and p-toluene sulfonic acid. The addition amount thereof is preferably from 1 weight ppm to 1 wt %.

As the stabilizer for radical polymerization can be used a conventionally known stabilizer for radical polymerization. Examples thereof include hydroquinone, hydroquinone monomethyl ether, catechol, and pyrogallol. The amount of the stabilizer to be added is preferably from 1 weight ppm to 1 wt %.

As the thickener can be used a conventionally known thickener. Examples thereof include poly (methylmethacrylate), methyl methacrylate/acrylic ester copolymers, methyl methacrylate/methacrylic ester copolymers, and cellulose derivatives. The amount of the thickener to be added is preferably from 0.1 to 20 wt %.

As the plasticizer can be used a conventionally known plasticizer. Examples thereof include dioctyl phthalate and dibutyl phthalate. The amount of the plasticizer to be added is preferably from 0.01 to 30 wt %.

As the thixotropic agent can be used a conventionally known thixotropic agent. Examples thereof include hydrophobic silica. The amount of the thixotropic agent to be added is preferably from 0.1 to 20 wt %.

Ingredients other than those described above may be added according to purposes. Examples of such additives include agents for enhancing adhesion, dyes, perfumes, fillers, crosslinking agents, tougheners, and organic solvents. With respect to these ingredients also, any known conventional technique can be applied to the 2-cyanoacrylate composition of the invention.

The 2-cyanoacrylate composition of the invention is effective in inhibiting the considerable deterioration in moist-heat resistance with time which is apt to occur in cured objects obtained with adhesives containing a curing accelerator. Although the reasons for this have not been elucidated, it is presumed that since the cyclic phenol sulfide derivative has lower hydrophilicity than the polyalkylene oxides and other curing accelerators used in conventional techniques, the cured object obtained with the composition of the invention is less influenced by water and is hence free from a considerable decrease in moist-heat resistance.

Furthermore, the 2-cyanoacrylate composition of the invention has a short setting time and does not impair an appearance, unlike the 2-cyanoacrylate compositions containing a conventional curing accelerator which have drawbacks in the bonding of adherends having a gap and in the setting time and appearance of overflow parts thereof. The reasons for this may be as follows. In the conventional compositions, polymerization proceeds from the exposed surface thereof or from the surface thereof in contact with an adherend, so that inner parts thereof cure slowly to cause unevenness of cured state. As a result, a surface layer thereof develops strains, which become wrinkles to cause the resultant cured material to be milk-white. In contrast, in the adhesive composition containing the cyclic phenol sulfide derivative having a specific structure, polymerization proceeds throughout the whole adhesive more evenly than the conventional compositions containing a polyalkylene oxide or another conventional curing accelerator. Because of this, the composition of the invention has excellent surface curability and gives a cured material having a satisfactory appearance.

The invention will be explained in more detail by reference to the following Examples and Comparative Examples, but the invention should not be construed as being limited to those Examples.

The following evaluation methods were used.

(1) Method for Measuring Setting Time:
(Polyacetal Resin)

Test pieces made of a polyacetal having the dimensions for use in the tensile bonding strength test as provided for in JIS K 6861-1995 were bonded to each other with an adhesive composition and kept fixed for given time periods. The time required for the test pieces to come to have a bonding strength of 3 kgf/cm$^2$ or higher was taken as the setting time.

(Chloroprene Rubber)

Test pieces made of chloroprene rubber having the dimensions for use in the tensile shear bonding strength test as provided for in JIS K 6861-1995 were bonded to each other with an adhesive composition and kept fixed for given time periods. The time required for the test pieces to come to have a bonding strength of 3 kgf/cm$^2$ or higher was taken as the setting time.

(Non-rigid Vinyl Chloride Resin)

Test pieces made of a non-rigid vinyl chloride resin having the dimensions for use in the tensile shear bonding strength test as provided for in JIS K 6861-1995 were bonded to each other with an adhesive composition and kept fixed for given time periods. The time required for the test pieces to come to have a bonding strength of 3 kgf/cm$^2$ or higher was taken as the setting time.

(2) Method for Determining Moist-heat Resistance:
(Polyacetal Resin)

Test pieces made of a polyacetal having the dimensions for use in the tensile bonding strength test as provided for in JIS K 6861-1995 were bonded to each other, subsequently aged for 24 hours, and then subjected to the tensile shear bonding strength test. The value of bonding strength thus obtained was taken as an initial strength. The test pieces which had been aged were allowed to stand in an atmosphere of 80° C. and 95% RH for 200 hours or 400 hours, subsequently cooled to room temperature, and then subjected to the tensile shear bonding strength test.

(Chloroprene Rubber)

Test pieces made of chloroprene rubber having the dimensions for use in the tensile shear bonding strength test as provided for in JIS K 6861-1995 were bonded to each other, subsequently aged for 24 hours, and then subjected to the tensile shear bonding strength test. The value of bonding strength thus obtained was taken as an initial strength. The test pieces which had been aged were allowed to stand in an atmosphere of 80° C. and 95% RH for 200 hours or 400 hours, subsequently cooled to room temperature, and then subjected to the tensile shear bonding strength test.

(Non-rigid Vinyl Chloride Resin)

Test pieces made of a non-rigid vinyl chloride resin having the dimensions for use in the tensile shear bonding strength test as provided for in JIS K 6861-1995 were bonded to each other, subsequently aged for 24 hours, and then subjected to the tensile shear bonding strength test. The value of bonding strength thus obtained was taken as an initial strength. The test pieces which had been aged were allowed to stand in an atmosphere of 80° C. and 95% RH for 200 hours or 400 hours, subsequently cooled to room temperature, and then subjected to the tensile shear bonding strength test.

(3) Clearance Setting Time (Clearance Curability):

A polyethylene plate having a recess having a diameter of 6 mm and a depth of 0.5 mm was used as a base after a few drops of DOP (dioctyl phthalate) were dropped into the recess in order to prevent adhesive leakage through a gap in the bottom of a test piece. A cylindrical test piece made of aluminum which weighed 100 g and had a hole having a diameter of 6.95 mm and a depth of 20 mm was placed on that polyethylene plate. A cylindrical pin made of aluminum having a diameter of 6.55 mm and a height of 40 mm was placed in the hole so as not to be in contact with the inner wall of the test piece. A 2-cyanoacrylate composition was poured into the space between the test piece and the pin. After allowing those to stand for a given period of time, the pin was held and lifted up. The time required for the test piece to be lifted up together with the pin was taken as the clearance setting time.

(4) Surfaces Curability (Surface Setting Time, Appearance of Surface-cured Material):

Several drops of an adhesive were dropped onto an EPDM (Ethylene Propylene Rubber) plate having dimensions of 3 mm×25 mm×50 mm. The drops were picked with a needle to ascertain curing. The time required for the drops to completely cure was taken as the surface setting time. Furthermore, the appearance of the resultant cured adhesive was examined and shown as the appearance of surface-cured material.

SYNTHESIS EXAMPLE 1

(Synthesis of 5,11,17,23-Tetra-tert-butyl-25,26,27,28-tetrakis(ethoxycarbomethoxy)-2,8,14,20-tetrathia[19,3,1, $1^{3.7},1^{9.13},1^{15.19}$]octacosa-1(25),3,5,7(28),9,11,13(27),15,17,19(26),21,23-dodecaene)

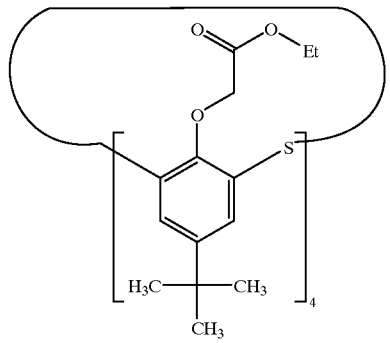

The target compound was synthesized from 5,11,17,23-tetra-tert-butyl-25,26,27,28-tetrahydroxy-2,8,14,20-tetrathia[19,3,1,$1^{3.7},1^{9.13},1^{15.19}$]octacosa-1(25),3,5, 7(28),9,11,13(27),15,17,19(26),21,23-dodecaene according to the method described in the Example 1 of JP-A-10-175971. The substance obtained was ascertained to be the target compound by GPC and NMR spectroscopy. NMR δ (CDCl$_3$):
1.09 (singlet, 36H, C(CH$_3$)$_3$),
1.28 (triplet, 12H, COOCH$_2$CH$_3$),
4.21 (quartet, 8H, COOCH$_2$CH$_3$),
5.18 (singlet, 8H, ArOCH$_2$CO),
7.29 (singlet, 8H, Ar—H).

EXAMPLE 1

The compound obtained in Synthesis Example 1 was incorporated into instantaneous adhesive Aron Alpha #201 (main component, ethyl 2-cyanoacrylate; manufactured by Toagosei Chemical Industry Co., Ltd.) in such an amount that the content thereof became 1 wt %. The adhesive composition thus prepared was subjected to the evaluations. The results obtained are shown in Tables 1 and 2.

SYNTHESIS EXAMPLE 2

(Synthesis of 5,11,17,23,29,35-Hexa-tert-butyl-37,38, 39,40,41,42-hexakis(ethoxycarbomethoxy)-2,8,14,20,26,32-hexathia[31,3,1,$1^{3.7},1^{9.13},1^{15.19},1^{21.25},1^{27.31}$] dotetraconta-1(37),3,5,7(42),9,11,13(41),15,17,19(40),21,23,25(39),27,29,-31(38),33,35-octadecaene)

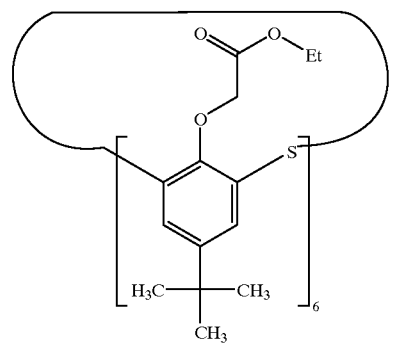

The target compound was synthesized from 5,11,17,23, 29,35-hexa-tert-butyl-37,38,39,40,41,42-hexahydroxy-2,8,14,20,26,32-hexathia[31,3,1,$1^{3.7}$, $1^{9.13},1^{15.19},1^{21.25},1^{27.31}$] dotetraconta-1(37),3,5,7(42),9,11,13(41),15,17,19 (40),21, 23,25(39),27,29,-31(38),33,35-octadecaene according to the method described in the Example 1 of JP-A-10-175971.

The substance obtained was ascertained to be the target compound by GPC and NMR spectroscopy.

NMR δ (CDCl$_3$):

1.09 (singlet, 54H, C(CH$_3$)$_3$),
1.28 (triplet, 18H, COOCH$_2$CH$_3$),
4.21 (quartet, 12H, COOCH$_2$CH$_3$),
5.18 (singlet, 12H, ArOCH$_2$CO),
7.29 (singlet, 12H, Ar—H).

EXAMPLE 2

The compound obtained in Synthesis Example 2 was incorporated into instantaneous adhesive Aron Alpha #201 in such an amount that the content thereof became 1 wt %. The adhesive composition thus prepared was subjected to the evaluations. The results obtained are shown in Tables 1 and 2.

SYNTHESIS EXAMPLE 3

(Synthesis of 5,11,17,23-Tetra-tert-butyl-25,26,27, 28-tetrakis((2-ethoxy)acetylacetoxy)-2,8,14,20-tetrathia[19,3,1,1$^{3.7}$,1$^{9.13}$,1$^{15.19}$]octacosa-1(25),3,5,7 (28),9,11,13(27),15,17,19(26),21,23-dodecaene)

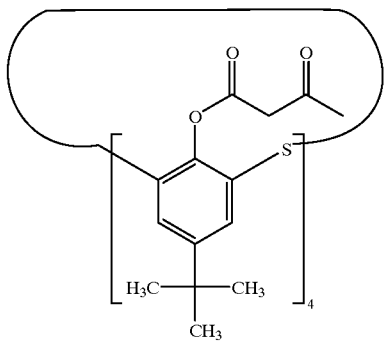

Into a 100-ml three-necked flask were introduced 1.44 g (0.002 mol) of 5,11,17,23-tetra-tert-butyl-25,26,27,28-tetrahydroxy-2,8,14,20-tetrathia[19,3,1,1$^{3.7}$,1$^{9.13}$,1$^{15.19}$] octacosa-1(25),3,5,7(28),9,11,13(27),15,17,19(26),21,23-dodecaene, 10 g of diketene, and 50 ml of dry THF. The contents were stirred while blowing nitrogen into the flask. Thereto was added 0.1 ml of pyridine. This mixture was stirred at room temperature for 18 hours, and the THF was removed thereafter. The resultant residue was dissolved in chloroform. The solution was washed with 4% hydrochloric acid twice and then with pure water once.

The organic layer was separated. Magnesium sulfate and activated carbon were added to the organic layer to dry and decolor the same, and the chloroform was removed thereafter. The resultant residue was dissolved in acetone, and this solution was added dropwise to toluene to conduct reprecipitation. This reprecipitation operation was conducted twice. The precipitate was taken out by filtration, air-dried overnight, subsequently vacuum-dried at 40° C. for 18 hours, and then weighed. As a result, the reaction product was recovered in an amount of 1.17 g (yield, 55.33%). The compound recovered was ascertained to be the target compound by GPC and NMR spectroscopy.

NMR δ (CDCl$_3$):

1.09 (singlet, 36H, C(CH$_3$)$_3$),
2.25 (triplet, 12H, ArOCOCH$_2$COCH$_3$),
3.6 (singlet, 8H, ArOCOCH$_2$COCH$_3$),
7.29 (singlet, 8H, Ar—H).

EXAMPLE 3

The compound obtained in Synthesis Example 3 was incorporated into instantaneous adhesive Aron Alpha #201 in such an amount that the content thereof became 1 wt %. The adhesive composition thus prepared was subjected to the evaluations. The results obtained are shown in Tables 1 and 2.

SYNTHESIS EXAMPLE 4

(Synthesis of 5,11,17,23-Tetra-tert-butyl-25,26,27, 28-tetrakis((2-ethoxy)ethoxycarbomethoxy)-2,8,14, 20-tetrathia[19,3,1,1$^{3.7}$,1$^{9.13}$,1$^{15.19}$]octacosa-1(25),3, 5,7(28),9,11,13(27),15,17,19(26),21,23-dodecaene)

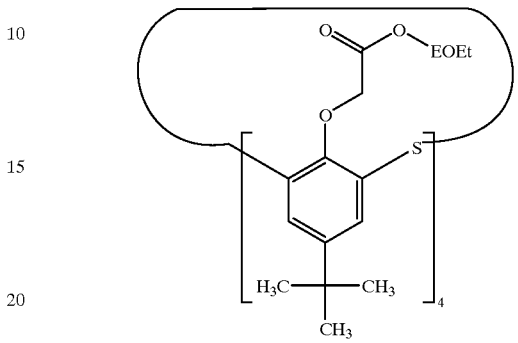

Into a 100-ml three-necked flask were introduced 1.44 g (0.002 mol) of 5,11,17,23,29,35-hexa-tert-butyl-37,38,39, 40,41,42-hexahydroxy-2,8,14,20,26,32-hexathia[31, 3,1,1,$^{3.7}$,1$^{9.13}$,1$^{15.19}$,1$^{21.25}$,1$^{27.31}$]dotetraconta-1(37),3,5,7 (42),9,11,13(41),15,17,19(40),21,23,25(39),27,29,-31(38), 33,35-octadecaene, 50 ml of dry acetone, and 2.76 g of potassium carbonate. The contents were stirred with refluxing. Thereto was added dropwise 4.22 g (0.02 mol) of ethoxyethyl bromoacetate. This mixture was reacted for 48 hours.

After the resultant reaction mixture was cooled to room temperature, the acetone was removed therefrom and the residue was extracted with toluene. The toluene was removed from the extract and the residue was dissolved in THF. This solution was passed through a column of activated alumina to conduct further purification. Thereafter, the solvent was removed. As a result, 1.28 g (yield, 51.54%) of the target compound was obtained as a slightly yellowish solid. The compound recovered was ascertained to be the target compound by GPC and NMR spectroscopy.

NMR δ (CDCl$_3$):

1.09 (singlet, 36H, C(CH$_3$)$_3$),
1.21 (triplet, 12H, COOCH$_2$CH$_2$OCH$_2$CH$_3$),
3.5 to 3.8 (multiplet, 16H, COOCH$_2$CH$_2$OCH$_2$CH$_3$),
4.22 (triplet, 8H, COOCH$_2$CH$_2$OCH$_2$CH$_3$),
5.18 (singlet, 8H, ArOCH$_2$CO),
7.29 (singlet, 8H, Ar—H).

EXAMPLE 4

The compound obtained in Synthesis Example 4 was incorporated into instantaneous adhesive Aron Alpha #201 in such an amount that the content thereof became 1 wt %. The adhesive composition thus prepared was subjected to the evaluations. The results obtained are shown in Tables 1 and 2.

SYNTHESIS EXAMPLE 5

(Synthesis of 5,11,17,23-Tetra-tert-butyl-25,26,27, 28-tetrakis (ethoxycarbomethoxy)-2,8,14,20-tetrasulfinyl[19,3,1,1$^{3.7}$,1$^{9.13}$,1$^{15.19}$]octacosa-1(25),3, 5,7(28),9,11,13(27),15, 17,19(26),21,23-dodecaene)

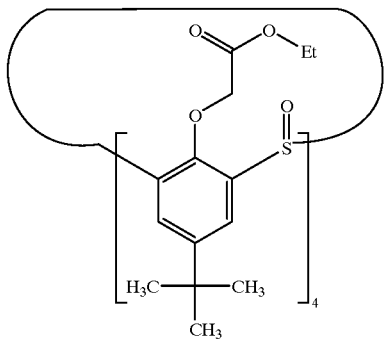

The target compound was synthesized from 5,11,17,23-tetra-tert-butyl-25,26,27,28-tetrahydroxy-2,8,14,20-tetrasulfinyl[19,3,1,1$^{3.7}$,1$^{9.13}$,1$^{15.19}$]octacosa-1(25),3,5,7 (28),9,11,13(27),15,17,19(26),21,23-dodecaene according to the method described in the Example 1 of JP-A-10-175971.

EXAMPLE 5

The compound obtained in Synthesis Example 5 was incorporated into instantaneous adhesive Aron Alpha #201 in such an amount that the content thereof became 1 wt %. The adhesive composition thus prepared was subjected to the evaluations. The results obtained are shown in Tables 1 and 2.

SYNTHESIS EXAMPLE 6

(Synthesis of 5,11,17,23-Tetra-tert-butyl-25,26,27, 28-tetrakis(ethoxycarbomethoxy)-2,8,14,20-tetrasulfonyl[19,3,1,1$^{3.7}$,1$^{9.13}$,1$^{15.19}$]octacosa-1(25), 3,5,7(28),9,11,13(27),15, 17,19(26),21,23-dodecaene)

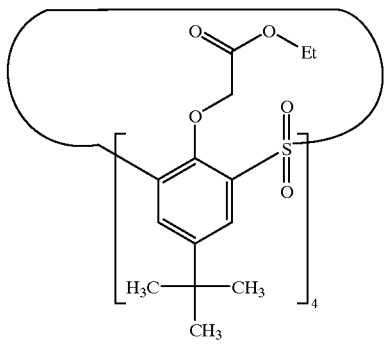

The target compound was synthesized from 5,11,17,23-tetra-tert-butyl-25,26,27,28-tetrahydroxy-2,8,14,20-tetrasulfonyl[19,3,1,1$^{3.7}$,1$^{9.13}$,1$^{15.19}$]octacosa-1(25),3,5,7 (28),9,11,13(27),15,17,19(26),21,23-dodecaene according to the method described in the Example 1 of JP-A-10-175971.

EXAMPLE 6

The compound obtained in Synthesis Example 6 was incorporated into instantaneous adhesive Aron Alpha #201 in such an amount that the content thereof became 1 wt %. The adhesive composition thus prepared was subjected to the evaluations. The results obtained are shown in Tables 1 and 2.

EXAMPLE 7

The compound obtained in Synthesis Example 1 was incorporated into instantaneous adhesive Aron Alpha #601 (main component, isopropyl 2-cyanoacrylate; manufactured by Toagosei Co., Ltd.) in such an amount that the content thereof became 1 wt %. The adhesive composition thus prepared was subjected to the evaluations. The results obtained are shown in Tables 1 and 2.

EXAMPLE 8

The compound obtained in Synthesis Example 1 was incorporated into instantaneous adhesive Aron Alpha #201 in such an amount that the content thereof became 0.1 wt %. The adhesive composition thus prepared was subjected to the evaluations. The results obtained are shown in Tables 1 and 2.

COMPARATIVE EXAMPLE 1

18-Crown-O-6 was incorporated into instantaneous adhesive Aron Alpha #201 in such an amount that the content thereof became 500 weight ppm. The adhesive composition thus prepared was subjected to the evaluations. The results obtained are shown in Tables 1 and 2.

COMPARATIVE EXAMPLE 2

18—Crown-0–6 was incorporated into instantaneous adhesive Aron Alpha #201 in such an amount that the content thereof became 1 weight ppm. The adhesive composition thus prepared was subjected to the evaluations. The results obtained are shown in Tables 1 and 2.

COMPARATIVE EXAMPLE 3

Polyethylene glycol having a weight-average molecular weight of about 1,000 was incorporated into instantaneous adhesive Aron Alpha #201 in such an amount that the content thereof became 1,000 weight ppm. The adhesive composition thus prepared was subjected to the evaluations. The results obtained are shown in Tables 1 and 2.

COMPARATIVE EXAMPLE 4

Polyethylene glycol having a weight-average molecular weight of about 1,000 was incorporated into instantaneous adhesive Aron Alpha #201 in such an amount that the content thereof became 1 weight ppm. The adhesive composition thus prepared was subjected to the evaluations. The results obtained are shown in Tables 1 and 2.

COMPARATIVE EXAMPLE 5

The dimethacrylate of polyethylene glycol having a weight-average molecular weight of about 1,000 was incorporated into instantaneous adhesive Aron Alpha #201 in such an amount that the content thereof became 1,000 weight ppm. The adhesive composition thus prepared was subjected to the evaluations. The results obtained are shown in Tables 1 and 2.

COMPARATIVE EXAMPLE 6

The dimethacrylate of polyethylene glycol having a weight-average molecular weight of about 1,000 was incorporated into instantaneous adhesive Aron Alpha #201 in such an amount that the content thereof became 1 weight ppm. The adhesive composition thus prepared was subjected to the evaluations. The results obtained are shown in Tables 1 and 2.

COMPARATIVE EXAMPLE 7

4-tert-ButylCalix[4]arene-O,O',O",O"'-tetraacetic acid tetraethyl ester was incorporated into instantaneous adhesive Aron Alpha #201 in such an amount that the content thereof became 1 wt %. The adhesive composition thus prepared was subjected to the evaluations. The results obtained are shown in Tables 1 and 2.

COMPARATIVE EXAMPLE 8

4-tert-ButylCalix[4]arene-O,O',O",O"'-tetraacetic acid tetraethyl ester was incorporated into instantaneous adhesive Aron Alpha #201 in such an amount that the content thereof became 1 weight ppm. The adhesive composition thus prepared was subjected to the evaluations. The results obtained are shown in Tables 1 and 2.

COMPARATIVE EXAMPLE 9

Instantaneous adhesive Aron Alpha#201 containing no curing accelerator was subjected to the evaluations. The results obtained are shown in Tables 1 and 2.

COMPARATIVE EXAMPLE 10

Instantaneous adhesive Aron Alpha#601 containing no curing accelerator was subjected to the evaluations. The results obtained are shown in Tables 1 and 2.

TABLE 2

| | Clearance setting time | Surface setting time | Appearance of surface-cured material |
|---|---|---|---|
| Example 1 | 5 min | 2 hr | colorless and transparent |
| Example 2 | 10 min | 3 hr | colorless and transparent |
| Example 3 | 5 min | 2 hr | colorless and transparent |
| Example 4 | 10 min | 3 hr | colorless and transparent |
| Example 5 | 20 min | 3 hr | colorless and transparent |
| Example 6 | 20 min | 4 hr | colorless and transparent |
| Example 7 | 5 min | 2 hr | colorless and transparent |
| Example 8 | 10 min | 3 hr | colorless and transparent |
| Comparative Example 1 | 20 min | 4 hr | milk-white |
| Comparative Example 2 | ≧30 min | ≧10 hr | colorless and transparent |
| Comparative Example 3 | 30 min | 8 hr | milk-white |
| Comparative Example 4 | ≧30 min | ≧10 hr | colorless and transparent |
| Comparative Example 5 | 30 min | 8 hr | milk-white |
| Comparative Example 6 | ≧30 min | ≧10 hr | colorless and transparent |
| Comparative Example 7 | 10 min | 3 hr | colorless and transparent |
| Comparative Example 8 | ≧30 min | ≧10 hr | colorless and transparent |
| Comparative Example 9 | ≧30 min | ≧10 hr | colorless and transparent |
| Comparative Example 10 | ≧30 min | ≧10 hr | colorless and transparent |

As described above, the 2-cyanoacrylate composition of the invention is excellent in the moist-heat resistance of cured objects obtained therewith and in instantaneously bonding properties when used. The composition is hence

TABLE 1

| | Polyacetal resin | | | | Chloroprene rubber | | | | Non-rigid vinyl chloride resin | | | |
|---|---|---|---|---|---|---|---|---|---|---|---|---|
| | | Bonding strength (N/mm$^2$) | | | | Bonding strength (N/mm$^2$) | | | | Bonding strength (N/mm$^2$) | | |
| | Setting time | Initial | After 200 hrs | After 400 hrs | Setting time | Initial | After 200 hrs | After 400 hrs | Setting time | Initial | After 200 hrs | After 400 hrs |
| Example 1 | 5 sec | 4.9 | 3.8 | 1.1 | 3 sec | 0.6* | 0.6* | 0.5 | 15 sec | 0.9* | 0.9* | 0.5 |
| Example 2 | 10 sec | 4.8 | 3.9 | 1.2 | 3 sec | 0.6* | 0.6* | 0.5 | 30 sec | 0.9* | 0.9* | 0.6 |
| Example 3 | 5 sec | 4.9 | 3.6 | 1.1 | 3 sec | 0.6* | 0.6* | 0.5 | 15 sec | 0.9* | 0.9* | 0.4 |
| Example 4 | 15 sec | 4.7 | 3.2 | 1.3 | 3 sec | 0.6* | 0.6* | 0.5 | 20 sec | 0.9* | 0.9* | 0.5 |
| Example 5 | 30 sec | 4.8 | 3.9 | 1.2 | 3 sec | 0.6* | 0.6* | 0.5 | 30 sec | 0.9* | 0.9* | 0.5 |
| Example 6 | 30 sec | 4.9 | 3.5 | 1.2 | 3 sec | 0.6* | 0.6* | 0.5 | 30 sec | 0.9* | 0.9* | 0.5 |
| Example 7 | 10 sec | 4.6 | 3.5 | 1.2 | 5 sec | 0.6* | 0.6* | 0.5 | 20 sec | 0.9* | 0.9* | 0.6 |
| Example 8 | 15 sec | 4.9 | 3.6 | 1.2 | 3 sec | 0.6* | 0.6* | 0.5 | 30 sec | 0.9* | 0.9* | 0.5 |
| Comp. Ex. 1 | 30 sec | 5.1 | 2.8 | 0.5 | 3 sec | 0.6* | 0.5 | 0.1 | 30 sec | 0.9* | 0.6 | 0.2 |
| Comp. Ex. 2 | >60 sec | 4.9 | 3.1 | 1.1 | 10 sec | 0.6* | 0.6* | 0.5 | 45 sec | 0.9* | 0.9 | 0.5 |
| Comp. Ex. 3 | 45 sec | 3.9 | 1.0 | 0 | 5 sec | 0.6* | 0.4 | 0 | 30 sec | 0.9* | 0.4 | 0 |
| Comp. Ex. 4 | >60 sec | 4.5 | 3.2 | 1.3 | 10 sec | 0.6* | 0.6* | 0.5 | 45 sec | 0.9* | 0.9 | 0.5 |
| Comp. Ex. 5 | 45 sec | 4.4 | 1.2 | 0 | 5 sec | 0.6* | 0.4 | 0 | 20 sec | 0.9* | 0.5 | 0 |
| Comp. Ex. 6 | >60 sec | 4.6 | 3.0 | 1.2 | 10 sec | 0.6* | 0.6* | 0.5 | 45 sec | 0.9* | 0.9 | 0.5 |
| Comp. Ex. 7 | 30 sec | 4.8 | 2.4 | 0.7 | 5 sec | 0.6* | 0.5 | 0.2 | 20 sec | 0.9* | 0.6 | 0.3 |
| Comp. Ex. 8 | >60 sec | 4.9 | 3.1 | 1.2 | 10 sec | 0.6* | 0.6* | 0.5 | 45 sec | 0.9* | 0.9 | 0.5 |
| Comp. Ex. 9 | >60 sec | 4.9 | 3.3 | 1.2 | 10 sec | 0.6* | 0.6* | 0.5 | 45 sec | 0.9* | 0.9* | 0.5 |
| Comp. Ex. 10 | >60 sec | 4.8 | 3.8 | 1.3 | 10 sec | 0.6* | 0.6* | 0.5 | 60 sec | 0.9* | 0.9* | 0.6 |

*Adherend failure usable in a wider range of industrial and domestic applications. In particular, since the composition attains a high level of a balance between moist-heat resistance and instantaneously bonding properties, it is useful in the automobile industry, where high moist-heat resistance is required. In this application, the composition is highly effective because it enables bonding lines to be operated at a higher speed and thereby attains a significantly heightened working efficiency. Furthermore, since the composition can bond adherends to each other in a short period of time even when the gap therebetween is relatively wide, it is free from the trouble of sufficiently cleaning or polishing adherend surfaces beforehand. As a result, the time required for bonding operation is considerably shortened and the operating efficiency is greatly increased. Even when the composition is used by general consumers having a poor knowledge about bonding, it can be easily applied because there is no need of paying attention to the gap or to an overflowed part of the composition during the bonding operation. The composition produces such marked effects.

What is claimed is:

1. A 2-cyanoacrylate composition comprising a 2-cyanoacrylate and a cyclic phenol sulfide derivative represented by the following general formula (1):

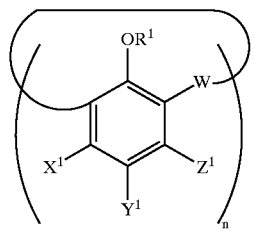

(1)

wherein W is a sulfido, sulfinyl, or sulfonyl group; $R^1$ is a functional group which does not initiate polymerization of a 2-cyanoacrylate; $X^1$, $Y^1$, and $Z^1$ each are a hydrogen atom or a functional group which does not initiate polymerization of a 2-cyanoacrylate; and n is an integer of 3 to 12; provided that the Ws, $R^1$s, $X^1$s, $Y^1$s, and $Z^1$s each may be the same or different.

2. The 2-cyanoacrylate composition of claim 1, wherein in the cyclic phenol sulfide derivative represented by general formula (1), at least one of the $R^1$s is a group having two or more oxygen atoms.

3. The 2-cyanoacrylate composition of claim 2, wherein in the cyclic phenol sulfide derivative represented by general formula (1), at least one of the $R^1$s is a group selected from —$CH_2COOR$, —$COCH_2COR$, and —$CH_2COOR^4OR^5$, wherein $R^2$, $R^3$, and $R^5$ each are an alkyl group and $R^4$ is an alkylene group.

4. The 2-cyanoacrylate composition of claim 1, wherein in the cyclic phenol sulfide derivative represented by general formula (1), all the $X^1$s and $Z^1$s are hydrogen atoms and all the Y s each are one member selected from hydrogen atom, an alkyl group, a halogenoalkyl group, a —$COR^6$group, an —$OR^7$ group, a —$COOR^8$ group, a —CN group, an —$NO_2$ group, a halogen atom, an —$SO_4R^9$ group, and an —$SO_3R^{10}$ group, wherein $R^6$, $R^7$, $R^8$, $R^9$, and $R^{10}$ each are an alkyl group.

5. The 2-cyanoacrylate composition of claim 4, wherein all the $Y^1$s in general formula (1) are tert-butyl groups.

6. The 2-cyanoacrylate composition of claim 1 wherein the 2-cyanoacrylate is selected from the group consisting of methyl 2-cyanoacrylate, ethyl 2-cyanoacrylate, propyl 2-cyanoacrylate, isopropyl 2-cyanoacrylate, butyl 2-cyanoacrylate, isobutyl 2-cyanoacrylate, amyl 2-cyanoacrylate, hexyl 2-cyanoacrylate, cyclohexyl 2-cyanoacrylate, octyl 2-cyanoacrylate, 2-ethylhexyl 2-cyanoacrylate, allyl 2-cyanoacrylate, propargyl 2-cyanoacrylate, phenyl 2-cyanoacrylate, benzyl 2-cyanoacrylate, methoxyethyl 2-cyanoacrylate, ethoxyethyl 2-cyanoacrylate, tetrahydrofurfuryl 2-cyanoacrylate, 2-chloroethyl 2-cyanoacrylate, 3-chloropropyl 2-cyanoacrylate, 2-chlorobutyl 2-cyanoacrylate, 2,2,2-trifluoroethyl 2-cyanoacrylate, and hexafluoropropyl 2-cyanoacrylate.

7. The 2-cyanoacrylate composition of claim 6 wherein the 2-cyanoacrylate may be prepared alone or as a mixture of two or more thereof.

* * * * *